(12) United States Patent
Williams

(10) Patent No.: US 12,282,582 B2
(45) Date of Patent: *Apr. 22, 2025

(54) COMPROMISE FREE CLOUD DATA ENCRYPTION AND SECURITY

(71) Applicants: Mayida Zaal, Montclair, NJ (US); Edward Bialek, Woodbridge, CT (US)

(72) Inventor: Henry R. Williams, Montclair, NJ (US)

(73) Assignees: Mayida Zaal; Edward Bialek

( * ) Notice: Subject to any disclaimer, the term of this patent is extended or adjusted under 35 U.S.C. 154(b) by 0 days.

This patent is subject to a terminal disclaimer.

(21) Appl. No.: 17/733,133

(22) Filed: Apr. 29, 2022

(65) Prior Publication Data
US 2023/0087628 A1 Mar. 23, 2023

Related U.S. Application Data

(63) Continuation of application No. 16/563,647, filed on Sep. 6, 2019, now abandoned, which is a continuation of application No. 15/428,812, filed on Feb. 9, 2017, now Pat. No. 10,445,524, which is a continuation of
(Continued)

(51) Int. Cl.
*G06F 21/62* (2013.01)
*G06F 12/14* (2006.01)
*G06F 21/86* (2013.01)
*H04L 9/40* (2022.01)

(52) U.S. Cl.
CPC ...... *G06F 21/6245* (2013.01); *G06F 12/1408* (2013.01); *G06F 21/6218* (2013.01); *G06F 21/6227* (2013.01); *G06F 21/86* (2013.01); *H04L 63/0428* (2013.01); *H04L 63/0435* (2013.01); *H04L 63/0442* (2013.01); *H04L 63/083* (2013.01); *H04L 63/108* (2013.01); *H04L 63/166* (2013.01); *G06F 2212/1052* (2013.01)

(58) Field of Classification Search
CPC ............. G06F 12/1408; G06F 21/57; G06F 21/60–604; G06F 21/62; G06F 21/6218; G06F 21/6227; G06F 21/6245; G06F 21/86; G06F 2212/1052; H04L 63/0428–0442; H04L 63/08; H04L 63/083–0846; H04L 63/10–102; H04L 63/105; H04L 63/108; H04L 63/166; H04L 63/20
See application file for complete search history.

(56) References Cited

U.S. PATENT DOCUMENTS

| 7,539,631 B1 * | 5/2009 | El-Haj | G06Q 30/0601 705/26.1 |
| 9,954,828 B1 * | 4/2018 | Chandrasekhar | H04L 9/0894 |
| 2010/0198730 A1 | 8/2010 | Ahmed | |

(Continued)

*Primary Examiner* — Kevin Bechtel
(74) *Attorney, Agent, or Firm* — Merchant & Gould P.C.

(57) ABSTRACT

A cloud data encryption and security system includes a central computing authority and a network of computing devices. At least some of the computing devices are pod computing devices physically hosted by an operator. The pod computing devices include a central processing unit and a computer readable storage media in data communication with the central processing unit. Data is encrypted in the computer readable storage media so that the owner can access the data but the operator cannot access the data.

20 Claims, 8 Drawing Sheets

Related U.S. Application Data application No. 14/487,259, filed on Sep. 16, 2014, now Pat. No. 9,607,170.

(60) Provisional application No. 61/988,125, filed on May 2, 2014.

(56) References Cited

U.S. PATENT DOCUMENTS

| | | |
|---|---|---|
| 2013/0007464 A1 | 1/2013 | Madden |
| 2014/0084764 A1 | 3/2014 | Doglio |
| 2014/0129830 A1* | 5/2014 | Raudaschl .......... G06F 21/6218 713/165 |
| 2014/0215210 A1* | 7/2014 | Wang .................. H04L 63/0428 713/165 |
| 2015/0127946 A1 | 5/2015 | Miller et al. |
| 2015/0244710 A1 | 8/2015 | Koster et al. |
| 2016/0350722 A1* | 12/2016 | Walker ................ G06F 16/2477 |

\* cited by examiner

COMPROMISE FREE CLOUD DATA ENCRYPTION AND SECURITY

CROSS REFERENCE TO RELATED APPLICATION

This application is a continuation of U.S. patent application Ser. No. 16/563,647, filed on Sep. 6, 2019, and entitled COMPROMISE FREE CLOUD DATA ENCRYPTION AND SECURITY, which is a continuation of U.S. patent application Ser. No. 15/428,812, filed on Feb. 9, 2017, now U.S. Pat. No. 10,445,524, and entitled COMPROMISE FREE CLOUD DATA ENCRYPTION AND SECURITY, which is a continuation of U.S. patent application Ser. No. 14/487,259, filed on Sep. 16, 2014, now U.S. Pat. No. 9,607,170 and entitled COMPROMISE FREE CLOUD DATA ENCRYPTION AND SECURITY, which claims priority to U.S. Provisional Patent Application No. 61/988,125, filed on May 2, 2014, and entitled COMPROMISE FREE CLOUD DATA ENCRYPTION AND SECURITY, the disclosures of which are hereby incorporated by reference in their entireties.

BACKGROUND

Large commercial cloud computing database storage systems store and maintain data, such as e-mail, bank statements, contact lists, documents, etc. that belong to individuals and/or companies that entrust such database providers with preserving the utmost privacy of their data. Such database storage systems are maintained by third party vendors that own and operate the servers and databases, but do not own the data stored therein. Such third party vendors, or maintainers, generally have legitimate access to all the resources associated with the processing device within the servers that host the databases. These maintainers are typically people working for the large cloud computing database storage providers who perform general database maintenance such as backups, upgrades, security checks, etc. on the system. Because the maintainers have control over the processing device that accesses the privately stored information in the database, the maintainers are weak points in the security of the database system. Accordingly, incidences of data theft have occurred as maintainers improperly search, view, and/or steal data belonging to an individual or company who have entrusted the commercial storage provider for safe storage of private data. Additionally, larger cloud database storage providers may employ hundreds of maintainers, all of whom have access to the processing device, and therefore the data, thereby creating a higher potential for data theft.

SUMMARY

In general terms, this disclosure is directed to a compromise free cloud data encryption and security system. One aspect is a system comprising a central computing authority; and a network of computing devices, at least some of the computing devices being pod computing devices physically hosted by an operator. In this embodiment, the pod computing devices include a first pod computing device comprising: a central processing unit; and computer readable storage media in data communication with the central processing unit. The computer readable storage media stores data instructions therein executable by the central processing unit, and comprises volatile memory and non-volatile memory in data communication with the central processing unit. The first pod computing device further comprises a data communication device configured to securely communicate, using encrypted communications, across a data communication network with a first user computing device, the central computing authority, and other computing devices in the network. The data instructions are executable by the processing device to cause the processing device to: receive a first user identifier, a first password, and a private key from a first user assigned to the first pod computing device using the data communication device; store the first user identifier and the password in the computer readable storage media to identify the first user as the owner of the first pod computing device; and store the private key in the volatile memory, such that the private key is erased from the computer readable storage media when the volatile memory loses power. Additionally provided is a database storing first user data in the non-volatile memory, wherein the first user data is encrypted in the database using the private key of the first user, such that the first user data is not accessible to the operator hosting the first pod computing device. The data instructions are further executable by the processing device to cause the processing device to: write user data to the database; read encrypted user data from the database; decrypt the encrypted user data and store unencrypted user data in the volatile memory; index at least some of the user data to perform searching or sorting of the user data; and execute an interface engine for communication with the first user computing device, the interface engine comprising one of: an application programming interface, and an application configured to generate a user interface to interact with the first user through the first computing device.

In another aspect, a pod computing device is provided, the pod computing device comprises: a processing device; a communication device; and a computer-readable storage media. The pod computing device further comprises a volatile storage device and a non-volatile storage device in data communication with the processing device; the computer-readable storage media storing data instructions. When the data instructions are executed by the processing device, it causes the processing device to: receive a private key from a remote user computing device through the communication device; store the private key in the volatile storage device; use the private key to encrypt and store data in the non-volatile memory; and use the private key to decrypt and retrieve data from the non-volatile memory. Additionally provided is a database storing data in the non-volatile memory, wherein the data is encrypted in the database using the private key. Additionally, the data instructions are further executable by the processing device to cause the processing device to: write data to the database; read encrypted data from the database; decrypt the encrypted data and store unencrypted data in the volatile memory; index at least some of the data to perform searching or sorting of the data; and execute an interface engine for communication with the computing device, the interface engine comprising one of: an application programming interface, and an application configured to generate a user interface.

In yet another aspect of the present disclosure, a computer-implemented method for registering a pod computing device to a user device using a cloud encryption system is provided. In this aspect, the method comprises: using a central server to communicate with the user device, comprising: receiving a request to register the user device; providing a pod computing device from a plurality of pod computing devices to the user device; providing a unique identification associated with the provided pod computing device to the user device; and using the pod computing device to communicate with the user device. Communicating with the user device further comprises: receiving, from the user device, a password and a key; and storing the key in a volatile memory component of the pod computing device.

DETAILED DESCRIPTION

Figure 1:
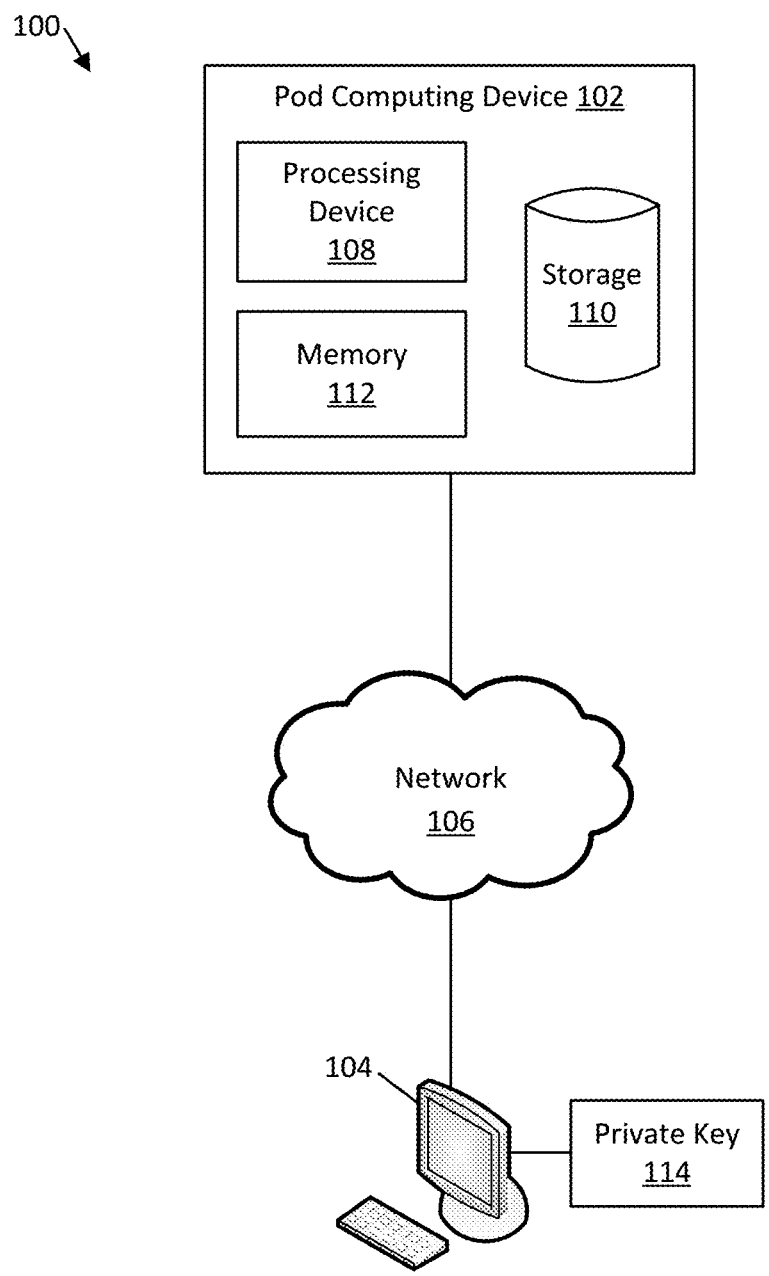
FIG. 1 is a schematic block diagram of an example individualized cloud computing system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Embodiments of the present disclosure provide a system and method for securely storing and maintaining data in a cloud database storage system that eliminates the need to trust third party vendors to maintain privately stored data. In particular, embodiments presented herein relate to eliminating access to information by the hosting provider. Specifically, embodiments of the present disclosure provide, for each individual user, separate hardware including a processing device, memory, and a storage device, collectively referred to as a "pod computing device." According to the aspects of the present disclosure, a pod computing device can be located anywhere, including a user's home or office. By physically separating each individual's processing devices, each user associated with that pod computing device is the only person with legitimate access to the data stored in the storage device. As an additional security measure, each pod computing device is configured to store, in the storage device, encrypted data that is accessible using a private key known only to the user. Such a system therefore also allows for searching and indexing of encrypted data stored in the secure database. Accordingly, because control over the processing device that accesses the data stored in the storage device is given only to the individual user, complete security over stored data is achieved.

FIG. 1 is a schematic block diagram of an example individualized cloud computing system 100. As shown in this embodiment, the system 100 includes a pod computing device 102 communicatively connected to a user computing device 104 via a network 106. As shown in the example embodiment, the pod computing device 102 further includes a processing device 108, a computer readable storage device 110, and a memory device. In some embodiments, the processing device 108 is, for example, a central processing unit. In some embodiments, the pod computing device 102 also includes an Ethernet connection for communication with the user computing device 104 over the network 106.

In embodiments, the storage device 110 stores a database, which is an organized collection of data. In this example, the processing device 108 is configured to communicate with the storage device 110. In some embodiments, the communication refers to writing data to, retrieving data from, or viewing data stored in the database. In some embodiments, a graph database is used to store data comprising records and edges. The records include data that can be arranged in fields, and the edges define the relationships between records in the database. The graph database is further described with reference to FIG. 3.

As shown, the user computing device 104 exchanges data with the pod computing device 102 over the network 106. In some embodiments, the data exchanged between the user computing device 104 and the pod computing device 102 is encrypted using a standard, encrypted network communication protocol, such as secure sockets layer (SSL) protocol or other types of secure, encrypted communication. In some embodiments, a software application runs on the user computing device 104, enabling the user to request, view, and generate data.

In some embodiments, the user computing device 104 also stores a private key 114, which may be provided by the user, for example. In some embodiments, the processing device 108 uses the private key 114 to encrypt data that is stored in the database and to decrypt data that is retrieved from the database. In some embodiments, the private key 114 is a password, such as a character string, provided by the user, that is stored on the user computing device 104 and in volatile memory within the pod computing device 102, such as random access memory (RAM). In some embodiments, the system memory 112 is volatile memory. Because the private key 114 is stored in volatile memory in the pod computing device 102, any loss of power will erase the private key 114 from memory. Accordingly, any illegitimate action by another to obtain the key, such as by physically breaking into or stealing the pod computing device 102, will erase the private key 114 from memory. Accordingly, an added level of security is achieved, rendering useless any attempt to illegitimately access the pod computing device 102, which stores encrypted data.

As shown in this embodiment, the network 106 facilitates the exchange of data between the pod computing device 102 and the user computing device 104. The network 106 also facilitates communication between one or more pods. An example of a network 106 is the Internet. The network 106 can include multiple communication networks that collectively perform the data communication. Examples of such networks include the Internet, a local area network, a wireless or cellular communication network, and the like.

Accordingly, the example embodiment presents a secure, cloud computing system using a hardware separated pod computing device 102, which has a physical or virtual processing device 108 that is not shared among several users. In embodiments in which the system implements a virtual processing device, a single processing device is used and the functionalities of the single processing device are divided among several users. Accordingly, the virtual processing device is a physical processing device that is securely shared among several users, functioning as if it were multiple, individual processing devices.

Additionally, encrypted data is stored in a storage device 110 that is decryptable using a private key 114 stored on the user computing device 104.

The storage device 110 includes non-volatile memory. The storage device 110 can be remote storage that is physically located remote from the processing device 108 but in data communication with the processing device 108, or can be local storage such as being physically located on the pod computing device 102, or a combination of remote and local storage. In some embodiments communication with the remote data storage device 110 utilizes a persistent storage interface. An example of a persistent storage interface is a network file system (NFS) protocol.

Figure 2:
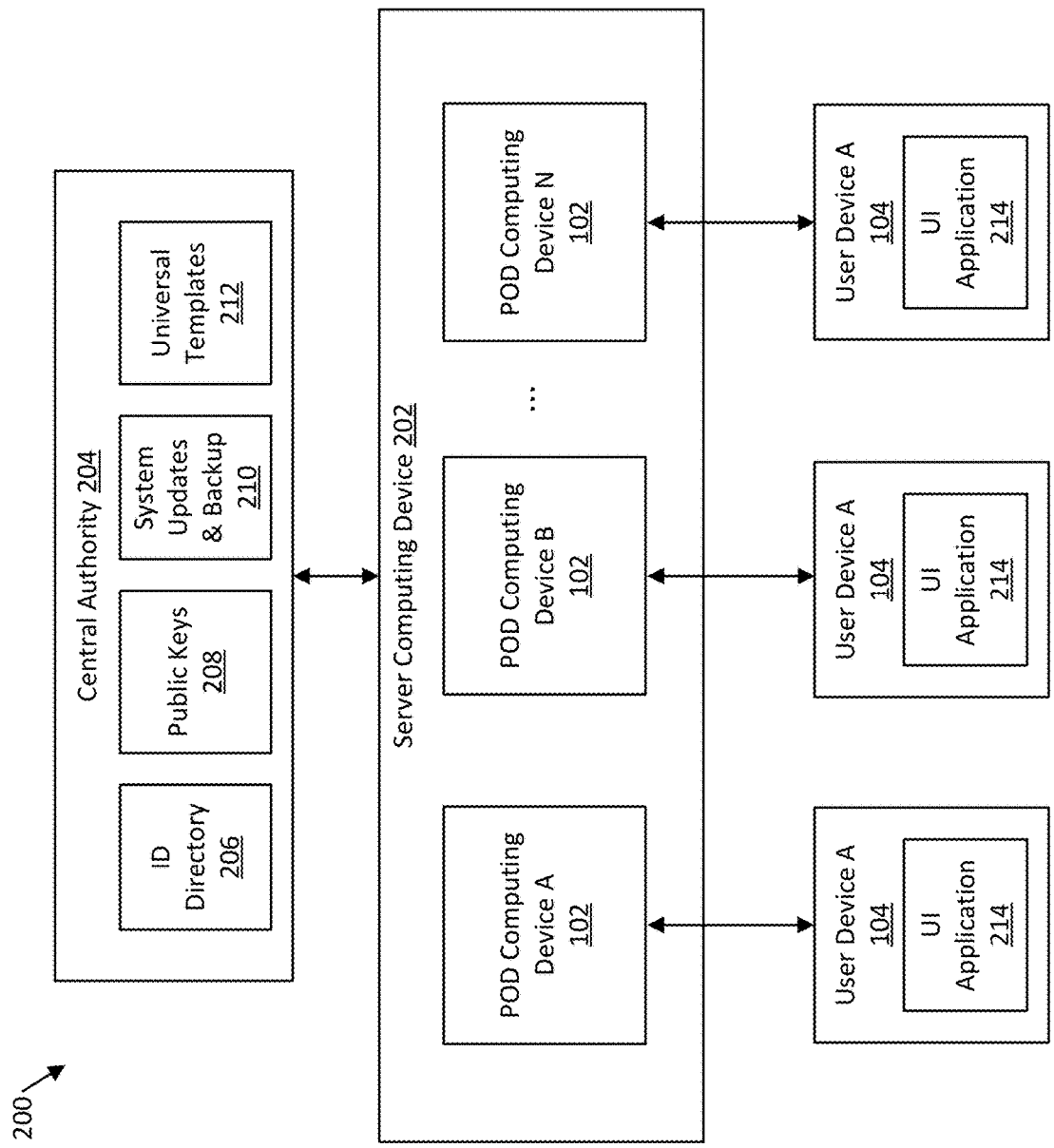
FIG. 2 is a schematic block diagram of an example pod computing system and user computing device system.

FIG. 2 is a schematic block diagram of an example system 200 including a server computing device 202 in communication with multiple user computing devices 104 and a central authority 204. As shown, the server computing device 202 hosts a plurality of pod computing devices 102, each associated with a single user computing device 104. Accordingly, the embodiment shown presents an alternative arrangement, in which multiple pod computing devices 102 are hosted within a single server, such as a rack mountable server. Accordingly, in some embodiments, a pod computing device 102 is individually located at a desired site, and in other embodiments, a pod computing device 102 is among a plurality of pod computing devices that are each mounted on a rack mountable server, yet physically separated from one another. Thus, embodiments of the present application describe a network of physically separate pod computing devices that are configured to communicate to each other. An example rack mountable server is the Proliant Server manufactured by Hewlett-Packard Development Company, L. P. In some embodiments, the server computing device 202 hosts approximately 450 individual pod computing devices 102, wherein each pod computing device 102 comprises a processing device 108, a storage device 110 storing a database, system memory 112, none of which are shared among other pods. Further, the pod computing device 102 includes a communication device such as an Ethernet connection, allowing each pod computing device 102 to communicate with a user computing device 104 and/or to another pod computing device 102 over the network 106.

As discussed herein, the communication between the pod computing device 102 and the user computing device 104 is a secure, encrypted communication using, for example the SSL protocol. In other embodiments, other secure communication protocols are used.

In alternative embodiments, achieving hardware separation may be done virtually rather than physically. In other words, the processing device may be designed such that it understands, at the hardware level, the concept of an individual user and segregates the operations of one user from another using a hypervisor. Accordingly, the processing device would, to the outside world, look like an array of processing devices, one for each user.

Alternatively, memory and storage can be physically mapped to a processing device as resources are needed, but in a physically secure arrangement. In an example embodiment, if a first user requires 1 gigabyte (GB) of solid state drive (SSD) and a second user requires 10 GB of SSD, such allocations can be made using a secure mapping scheme having secure access rules. Either of these two alternative embodiments may present a lower cost solution from the embodiment shown, wherein all pod computing devices 102 are physically separated within the server computing device 202.

Additionally shown in this embodiment is a central authority 204 that performs administrative functions and is in communication with the server computing device 202. In some embodiments, the central authority 204 is a central database that is accessible by each pod computing device 102 in order to, for example, store pod identifications and public keys, maintain system backups and software updates, and store templates. Additionally, in some embodiments, the central authority is also responsible for initially setting up user accounts and allocating a pod computing device 102 to users. As shown in this embodiment, the central authority 204 is independent from each of the pod computing devices 102 and does not have authority to access data stored thereon or the private keys 114. In some embodiments, the central authority 204 includes an identification directory 206 (ID directory), a public keys database 208, a system updates and backup database 210, and a universal templates database 212.

In an example embodiment, the ID directory 206 stores and maintains each the unique identification associated with each pod computing device 102. In some embodiments, each pod computing device 102 is associated with a unique identification that allows each pod computing device 102 to be directly identifiable and accessible. In embodiments, this unique identification is a uniform resource locator and in other embodiments it is the IP address of the pod computing device 102. Accordingly, the central authority 204 stores and maintains the ID directory 206 in order to allow users to search for another user's unique identification in order to communicate with a particular user's pod computing device 102.

In some embodiments, the central authority 204 maintains a public key database 208 for storing, and making available to each user, the public key associated with each pod computing device 102. Public keys are used to securely encrypt data that is sent from one pod computing device 102 to another. In some embodiments, public keys are generated by the pod computing device 202 upon registration of the user computing device 104 with the pod computing device 102. In other embodiments, the user computing device 104 or the central authority 204 generates the public key.

In an example embodiment, a sending pod computing device will initially search for the public key associated with the receiving pod computing device in the public key database 208. In some embodiments, this is performed by first searching for the receiving pod computing device's unique identification in the ID directory 206 and thereafter using the unique identification to search for, or request, the public key associated with the receiving pod computing device in the public key database 208. The sending pod computing device will thereafter encrypt the data with the public key associated with the receiving pod computing device. Once the data is encrypted with the public key associated with the receiving pod computing device, the only way to decrypt the data is by using the private key associated with the receiving pod computing device. Accordingly, in this example, once the data is received, the receiving pod computing device would decrypt the data with the private key known only to the user associated with the receiving pod computing device. Accordingly, data can be securely exchanged between pods. Although the public key database 208 is shown separately from the ID directory 206, in some embodiments, the unique pod identification and public keys are maintained in single database.

In an example embodiment, the system updates and backup database 210 stores software updates and system backups for each pod computing device 102. In an example embodiment, the central authority 204 maintains system updates and backups for each pod computing device 102. In embodiments, the user issues a command to retrieve and thereafter install an update or to back up the system, thereby preventing the central authority 204 from independently upgrading or backing up the pod computing device 102. In some embodiments, there are two types of backups: a snapshot backup and an incremental backup. The snapshot backup is a full backup of the system at a specific period in time. Accordingly, each subsequent snapshot backup performs a full backup of the system, regardless if any changes are made. In contrast, an incremental backup backs up each change that occurs, in real time. Accordingly, an incremental backup continuously backs up only incremental changes in the system. Regardless of the backup type, the backed up system stored in the central system updates and backup database 210 is encrypted using the private key 114, thereby preventing any unwarranted access to the data.

The central authority 204 performs administrative functions on the server computing device 202 and pod computing devices 102 stored thereon. In particular, the central authority 204 maintains a universal templates database 212. The universal templates database 212 stores pre-defined templates, which define a field structure for data objects across all pod computing devices. For example, the universal templates database 212 may store an email template, which defines various fields associated with an email, such as, recipient information, sender information, a subject text field, and an email body text field. Alternatively, a contact template may be saved in the universal templates database 212 as having fields relating to a contact's first name, last name, company name, email address, phone number(s), fax number, and address. Accordingly, the universal templates database 212 organizes a common format for storing templates so each pod computing device 102 operates on the same format in order to maintain consistency. Accordingly, these templates are saved in the universal templates database 212 and made accessible across all pod computing devices 102. In alternative embodiments, some template types are not meant to be publicly available, and are therefore denoted as being available to individual pod computing devices 102 and/or groups. Accordingly, some template types may be privately accessible to certain groups of pod computing devices 102, such as a company. In some embodiments, the universal template database 212 stores the latest version of various templates, which are thereafter stored in the storage device 110 of each pod computing device 102.

As shown in this embodiment, each user computing device 104 includes a user interface application 214 that sends messages, such as remote calls, to the associated pod computing device 102. In this embodiment, the pod computing device 102 has an application programming interface (API) that receives the calls directing the processor to perform certain functions. In this embodiment, the user interface application 214 generates a graphical user interface on the user computing device 104 and is configured to make and receive calls to and from the pod computing device 102 and/or the central authority 204. Accordingly, data is generated through the user interface application 214 on the user computing device 104. Additionally, the user interface application 214 communicates with the central authority 204 to update the pod computing device 102 software or to back it up, as disclosed herein.

Although the example embodiment describes the use of a user interface application 214, a web page may alternatively be used wherein the pod computing device 102 generates one or more web pages for direct user interaction with the pod, thereby eliminating the need for a user interface application 214 on a user computing device 104.

In some embodiments the pod computing device 102 includes an interface engine for communication with a user computing device. In some embodiments the interface engine provides an application programming interface. An example of the application programming engine is the API engine 604 described herein. In other embodiments, the interface engine includes an application configured to generate a user interface to interact with the first user through the computing device. For example, the interface engine operates as a web server that generates and sends web page data. The web page data is interpreted and displayed to the user, such as through a browser software application running on the user computing device 104. Other embodiments include other interface engines.

Figure 3:
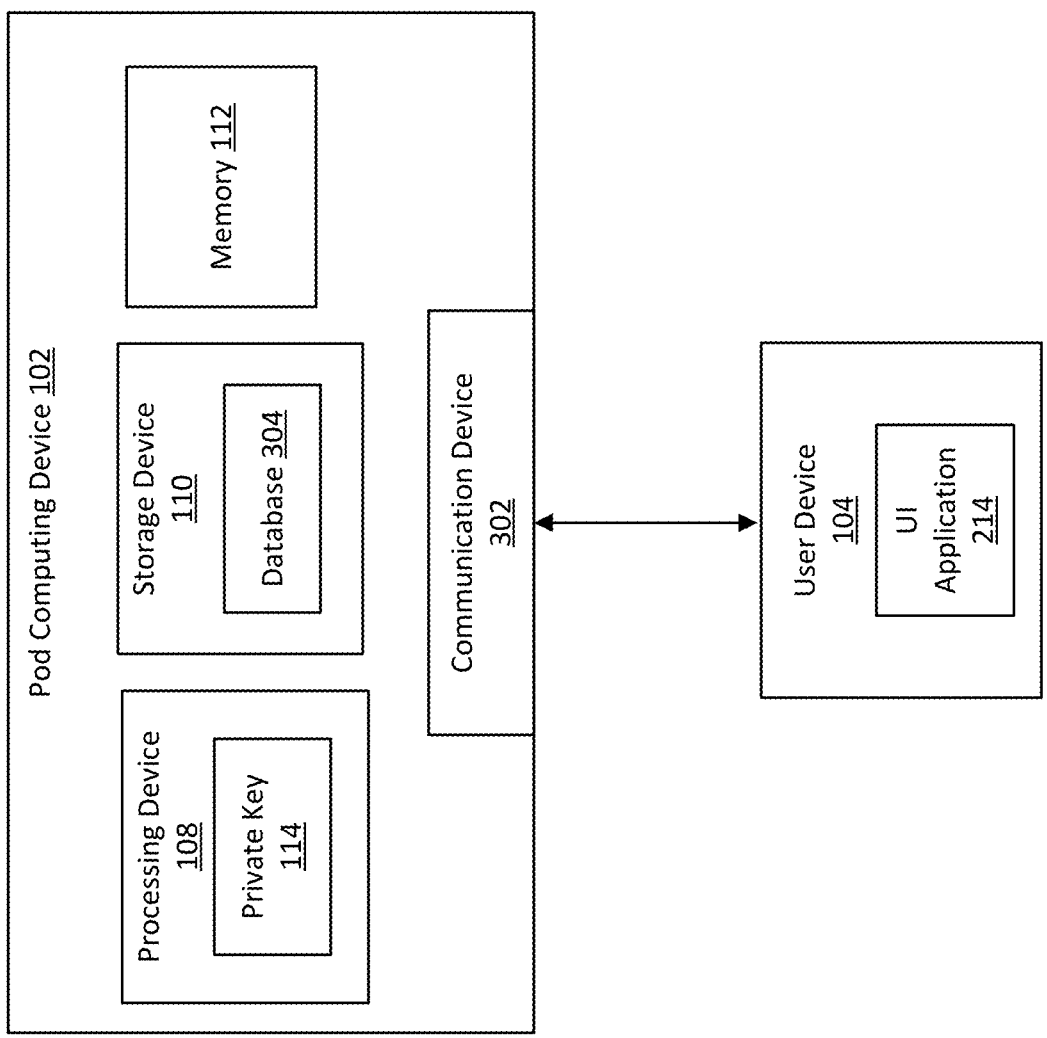
FIG. 3 illustrates a block diagram of an example pod computing device communicatively connected to a user computing device.

FIG. 3 illustrates a block diagram of a pod computing device 102 communicatively connected to a user computing device 104. As shown in this embodiment, the pod computing device 102 includes a processing device 108, a storage device 110, system memory 112, and a communication device 302. Additionally shown in this embodiment is the user computing device 104 including a user interface application 214 that interfaces with the pod computing device 102.

In some embodiments, the processing device 108 stores the encrypted private key 114. As discussed herein, in some embodiments, the private key 114 is stored within volatile memory of the pod computing device 102 and is therefore erased upon loss of power to the pod computing device. In some embodiments, this volatile memory is the system memory 112. In some embodiments, the processing device 108 encrypts data that is sent to the storage device 110 using drive encryption methodologies. Accordingly, all the data stored in the storage device 110 is encrypted using the private key that is known only to the user. Thus, any illegitimate attempt to access information in the storage device 110 is rendered useless without the private key.

Additionally, the processing device 108 uses the private key 114 to decrypt a data object as is requested by the user. For example, if the processing device 108 retrieves a data object from the storage device 110, the processing device 108 uses the private key 114 to decrypt the retrieved data object.

As shown in this embodiment, the pod computing device 102 includes a communication device 302. In some embodiments, this communication device is an Ethernet connection device, including an Ethernet connector, controller, and drivers. The communication device also encrypts data that is sent over the network 106 using the SSL transport protocol.

As an example, if a user, using the user computing device 104, requests to view a data object stored in the storage device 110, the processing device 108, using the private key 114, will decrypt the requested data object and route the requested data object to the communication device 302. The communication device will encrypt the data using the SSL transport protocol and send the encrypted data to the user computing device 104 through the network 106. Thus, according to embodiments of the present disclosure, data is securely stored and transmitted such that only the user who owns the individual pod computing device 102 has control over and access to data stored thereon.

In some embodiments, the storage device 110 stores thereon, a database 304, such as a graph database. In a graph database, data objects are stored in the form of records and edges. As referred to herein, "data object" refers to both records and edges. Each record can include various types of data. In some embodiments, record data is stored in fields. For example, a record, such as a "contact" can include fields such as a person's first name, last name, company, address, phone number, etc. Other records can include other data as desired. Records are connected with other records via edges, which are also stored in the database 304. An edge defines a connection, or a relationship between records. For example, a first record, such as a contact has fields such as a first name and a last name, and a second record, such as an appointment has fields such as a date and a time. In this example, the first record and the second record are connected by an edge, which defines the relationship between the two records.

Figure 4:
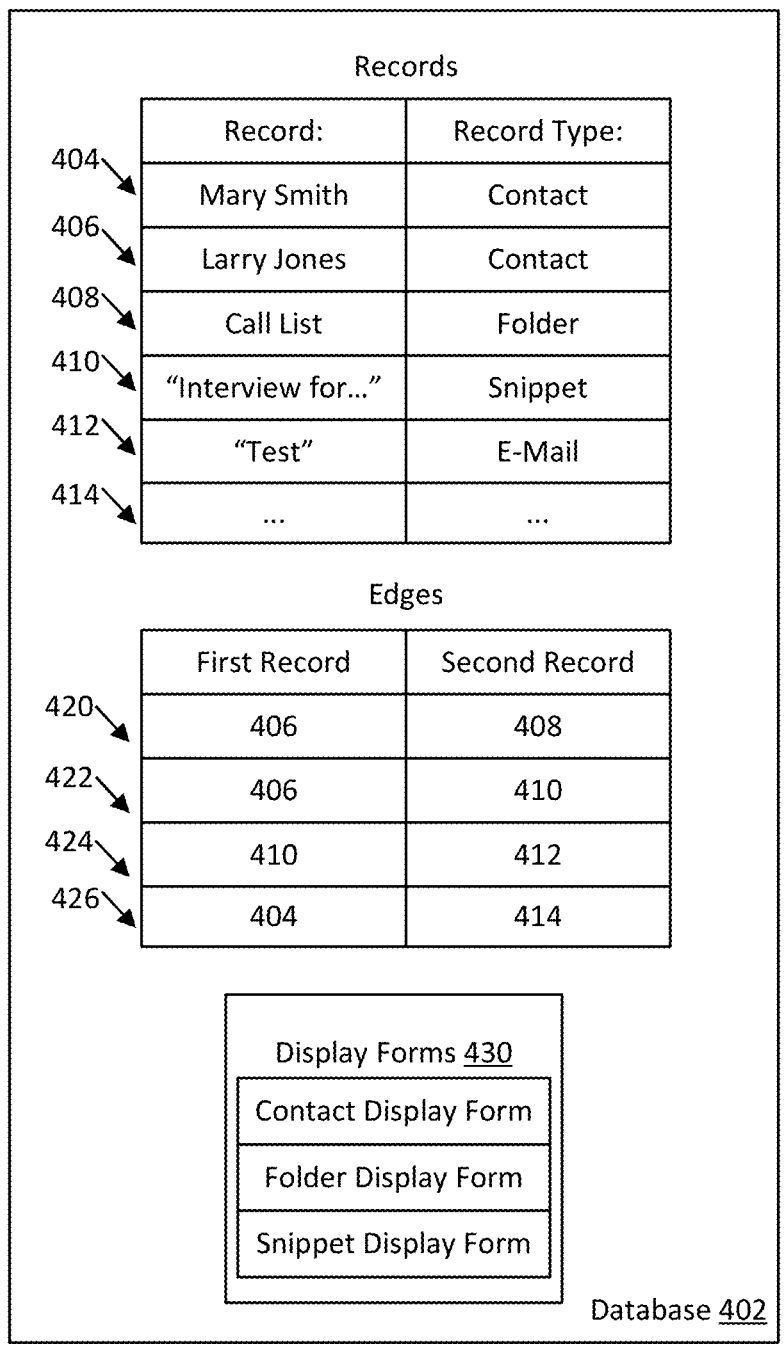
FIG. 4 is a schematic block diagram of a graph database, as discussed with reference to FIG. 3

FIG. 4 is a schematic block diagram of a graph database 402, as discussed with reference to FIG. 3. In this example, within the database 402 includes records and edges. The records include records 404, 406, 408, 410, 412. The edges include edges 420, 422, and 424. Display forms 430 are also included in some embodiments of the graph database 402.

Each record can include various types of data. In some embodiments the record data is stored in fields. For example, record 404 includes a type of "contact." The record can include additional data arranged in a plurality of fields. An example of field data includes a first name ("Mary"), last name ("Smith"), as well as other fields such as, but not limited to, company, title, address, city, phone number, etc. Other records include other data, as desired.

Records are connected with other records via edges, which are stored in database 402. For example, edge 420 defines a connection between record 406 ("Larry Jones" contact) and record 308 ("Call List" folder). Edge 422 defines a connection between record 406 ("Larry Jones" contact) and record 410 ("Interview for" snippet). Similarly, edge 424 defines a relationship between record 410 "Interview for" snippet) and record 412 ("Test" e-mail).

Figure 5:
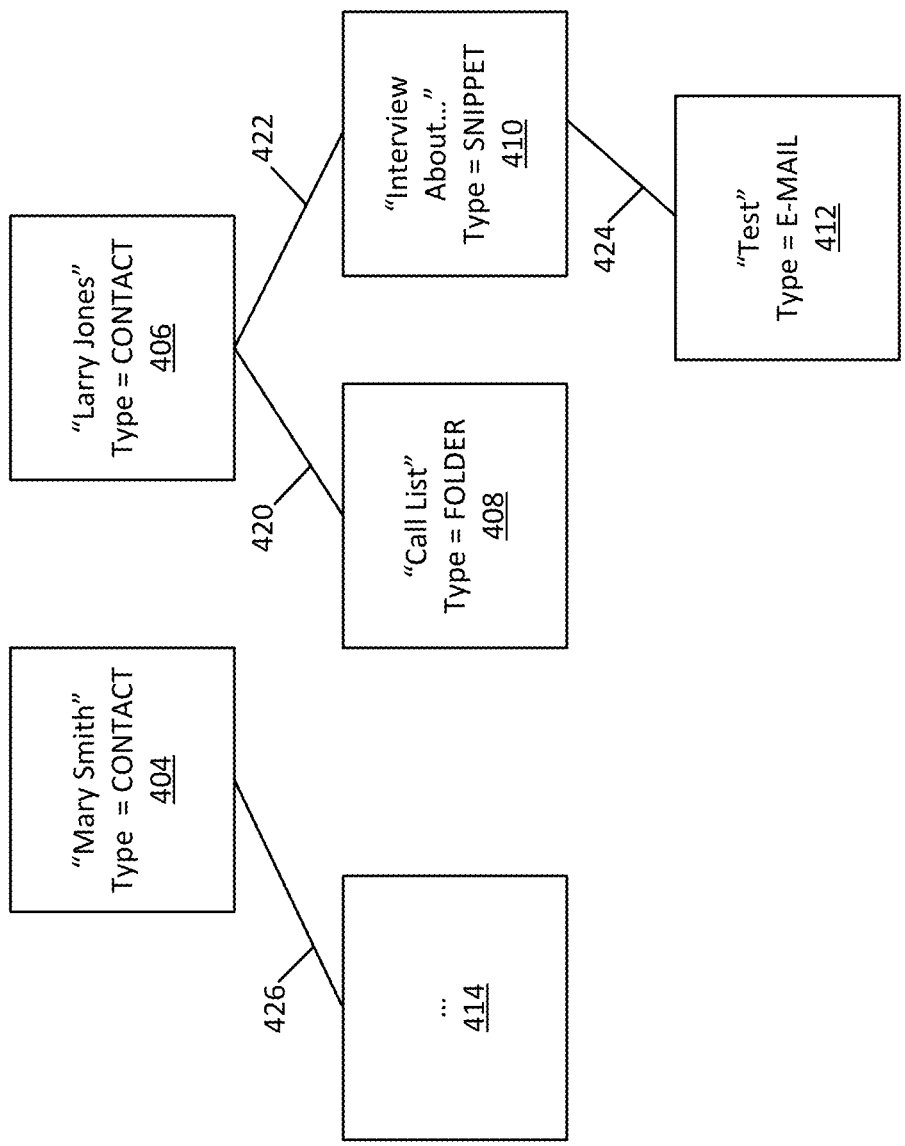
FIG. 5 graphically illustrates the data and relationships defined in the example data stored in the example database, shown in FIG. 4.

FIG. 5 graphically illustrates the data and relationships defined in the example data stored in the example database 402, shown in FIG. 4.

Record 406 ("Larry Jones" contact) is connected with record 408 ("Call List" folder) by edge 420, and with record 410 ("Interview about" snippet) by edge 422. Additionally, record 412 ("Test" e-mail) is connected to record 410 ("Interview about" snippet) by edge 424. Also shown in this embodiment, record 404 ("Mary Smith" contact) is connected with other records, as illustrated by record 414, which is connected by edge 426.

In some embodiments, the graph database 402, as discussed herein, is useful to implement structured data communication. In some embodiments of the present disclosure, data communication between pod computing devices 102 is structured, such that the records and edges defined in the graph database 402 are sent to other pod computing devices 102, as opposed to traditional data transfer in which simple text objects are exchanged. Accordingly, by exchanging data (records) and the relationships (edges) between the data, advanced data processing can occur by the recipient pod computing device 102. For example, in the context in which a bank invoice is sent to a pod computing device 102, the data is sent as a collection of database entries, which is easily stored in the database 402. Accordingly, a user can search and query the database 402 stored on the pod computing device for the bank invoice information rather than entering the data manually. Although this embodiment refers to a graph database 402, in alternative embodiments, other database implementations are used, such as, for example, a relational database.

Figure 6:
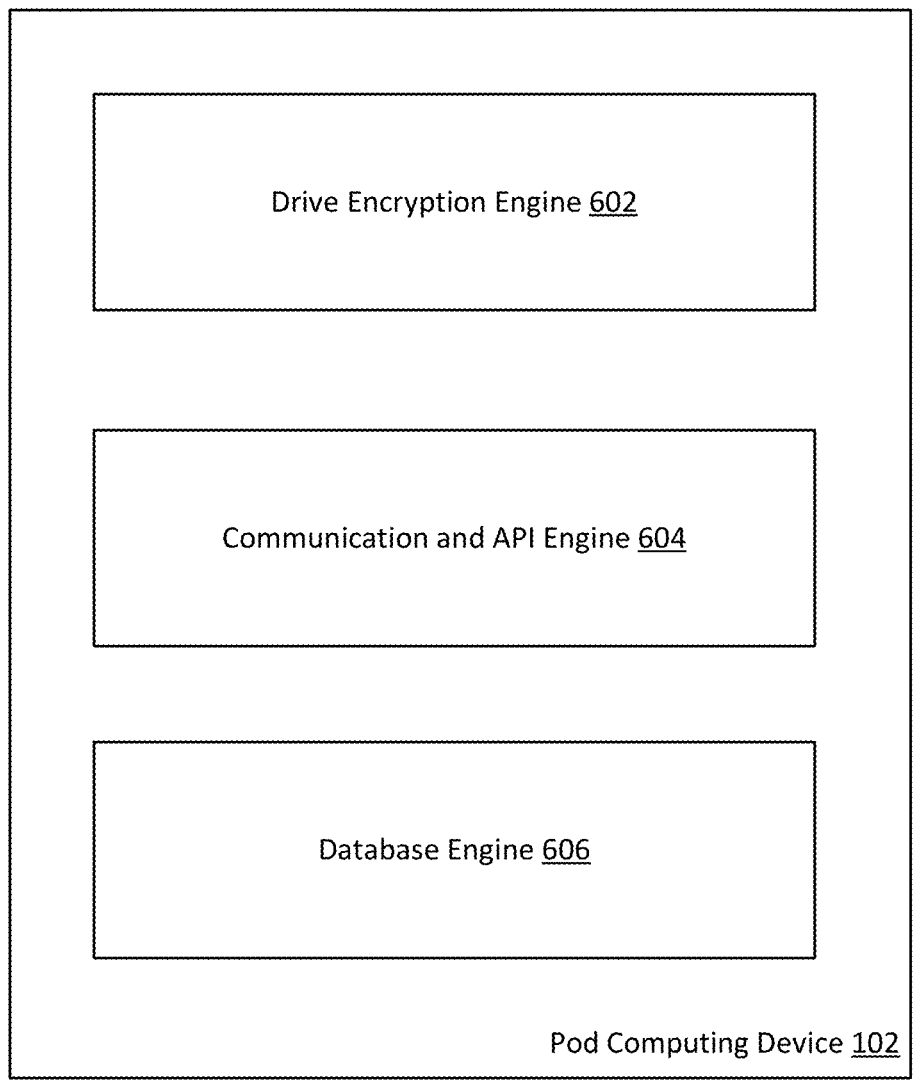
FIG. 6 illustrates a block diagram of an example pod computing device.

FIG. 6 illustrates a block diagram of an example pod computing device 102. In the example embodiment, the pod computing device 102 includes a data encryption engine 602, a communication and API engine 604, and a database engine 606. In some embodiments, one or more of these engines are stored in the data storage device 110 or system memory 112.

As discussed herein, the data encryption engine 602 manages the encryption processes of the pod computing device 102. In some embodiments, the data encryption engine 602 manages the drive encryption performed on the data stored in the storage device 110. In particular, the data encryption engine 602 dynamically encrypts data using the private key 114 as data is processed and stored by the processing device 108. The data encryption engine 602 is also used to decrypt data that is retrieved from the storage device 110 or from another pod computing device 102. Further, in some embodiments, the data encryption engine 602 manages data encryption using a public key for data communicated to other pod computing devices 102. In some embodiments, the data encryption engine 602 further manages data decryption for data received by other pod computing devices 102.

In some embodiments, the communication and API engine 604 manages data communication between the user computing device 104, central authority 204, and other pod computing devices 102. In some embodiments, the communication and API engine 604 manages the search and storage of information stored on the pod computing device 102. Additionally, in some embodiments, the communication and API engine 604 manages an API library that manages the specifications for various routines, calls, and data structures associated with the API, such as the generation of a user interface. In other embodiments, the communication and API engine 604 manages a secure user log-in process that checks user credentials when a user logs in and communicates with the pod computing device from the user computing device 104.

In some embodiments, the communication and API engine 604 manages data communication between the pod computing device 102 and the central authority 204. For example, the communication and API engine 604 communicates with the central authority 204 to retrieve a unique pod identification and/or a public key in order to exchange data with another pod computing device 102. Additionally, the communication and API engine 604 contacts the central authority 204 to perform a system update and/or a system backup. Additionally, in some embodiments, the communication and API engine 604 may contact the central authority 204 to retrieve a universal template.

In some embodiments, the communication and API engine 604 manages data communication between pod computing devices 102. As disclosed in the aspects of the present disclosure, pod computing devices 102 share data using permissions set by users who own the data and system synchronization. In particular, for each data object (i.e., each record and edge, for example), the owning user assigns a permission, such as, for example "public," "private," and "shared." The public permission allows any user to view the data object. The private permission allows only the user who owns the data to view the data object. The shared permission allows either identified users or identified groups to view the data object. For example, a first user may share a data object with a second user by appropriately setting the permission associated with the data object. Alternatively or additionally, the first user may share a data object with a group of users by setting the permission associated with a data object accordingly. Thus, by sharing a data object with a group, all users within that group may view the data object. Accordingly, a data object is shared with another user by giving particular users and/or groups permission to view the data object.

Once the permission is set, synchronization is performed on that data object so as to create copies of that data object, while maintaining the database structure, as discussed herein. Those structured copies are then encrypted and sent to the designated pod computing device 102 using the methods described herein. As discussed herein, the data and its relationships are fully maintained as it is distributed to a recipient pod computing device 102. Accordingly, the recipient pod computing device 102 can store the data in a searchable format.

In some embodiments, the user who owns the data object permits the sharing of updates to data object(s). For example, if a data object is shared with another user or a group of users, any subsequent updates to that data object may also be shared. In some embodiments, the user interface application 214 operating on the user computing device 104 is notified whether an update has occurred and thereafter requests the updated data object.

Accordingly, the communication and API engine 604 manages permissions associated with each data object (i.e., whether a data object is public or private), and hence, whether data can be accessed by another pod computing device 102 or a group.

In some embodiments, the database engine 606 manages how data is stored in the storage device 110. As discussed herein, with reference to FIGS. 4 and 5, a database stored in the storage device 110 is a graph database. Accordingly, the database engine 606 is responsible for defining records and edges, and the associated permissions, of the stored data.

Figure 7:
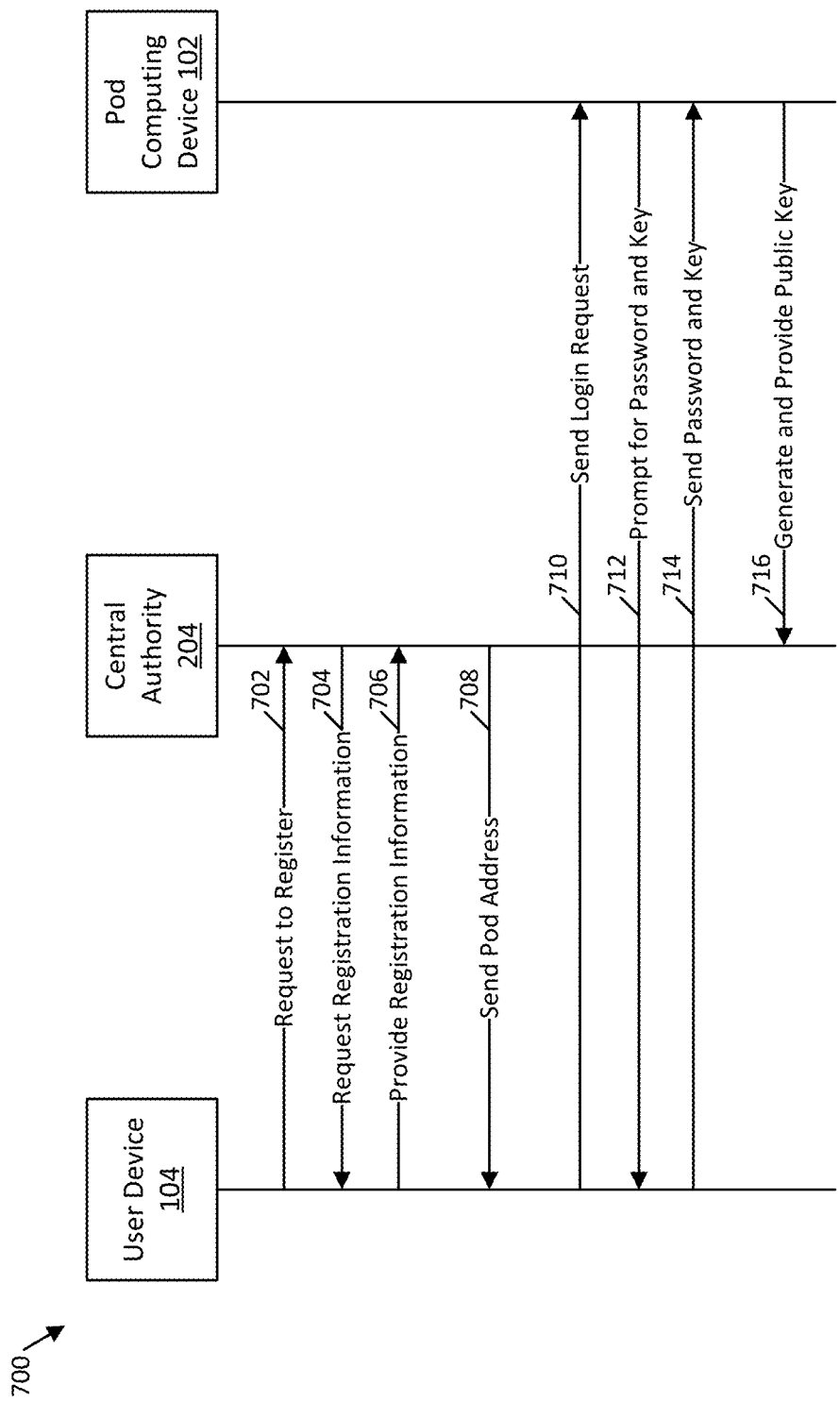
FIG. 7 is a communication diagram illustrating a process to set up a user computing device with a pod computing device through a central authority.

FIG. 7 is a communication diagram illustrating a process to set up a user and the user computing device 104 with a pod computing device 102 through a central authority 204. In this example embodiment, the user, using a user computing device 104 initially sends a request to register message 702 to the central authority 204. As described herein, the central authority is responsible for system administration of the network of pod computing devices 102. The central authority 204 is configured to allocate a pod computing device 102 to a requesting user.

Upon receiving the request to register message 702, in some embodiments, the central authority 204 sends the user a message 704 requesting registration information. In some embodiments, this message 704 involves seeking user identification information, such as contact information. In some embodiments, the request for registration information message 704 is unnecessary as the user supplies this information initially in the request to register message 702. Upon receiving the request registration information message 704, in some embodiments, the user will send the requested contact information to the central authority 204. Upon receiving the requested information from the user, the central authority 204 will allocate a pod computing device 102 to the requesting user and send a message 708 to the user with the unique pod identification information. As discussed herein, the unique pod identification information may refer to a unique IP address or URL of the pod computing device 102. Accordingly, the user may now independently contact the pod computing device 102 to continue the setup process.

The user may send a login request message 710 to the pod computing device 102 using the unique pod identification information. In some embodiments, this refers to requesting the pod computing device 102 to set up a password and private key. Accordingly, in message 712, the pod computing device prompts the user to enter a password and a private key 114. Upon receipt of message 712, the user may send to the pod computing device 102 a password and private key 114. As discussed herein, the password is used to log into the user interface application 214, whereas the private key 114 is stored on the user computing device 104 and in volatile memory within the pod computing device 102. Finally, in some embodiments, upon receiving a password and private key 114 from the user, the pod computing device 102 generates a public key. As discussed herein, the public key is used to encrypt data that is shared among and distributed to other pod computing devices 102. Accordingly, the pod computing device 102 sends the public key information to the central authority 204 in message 716.

Figure 8:
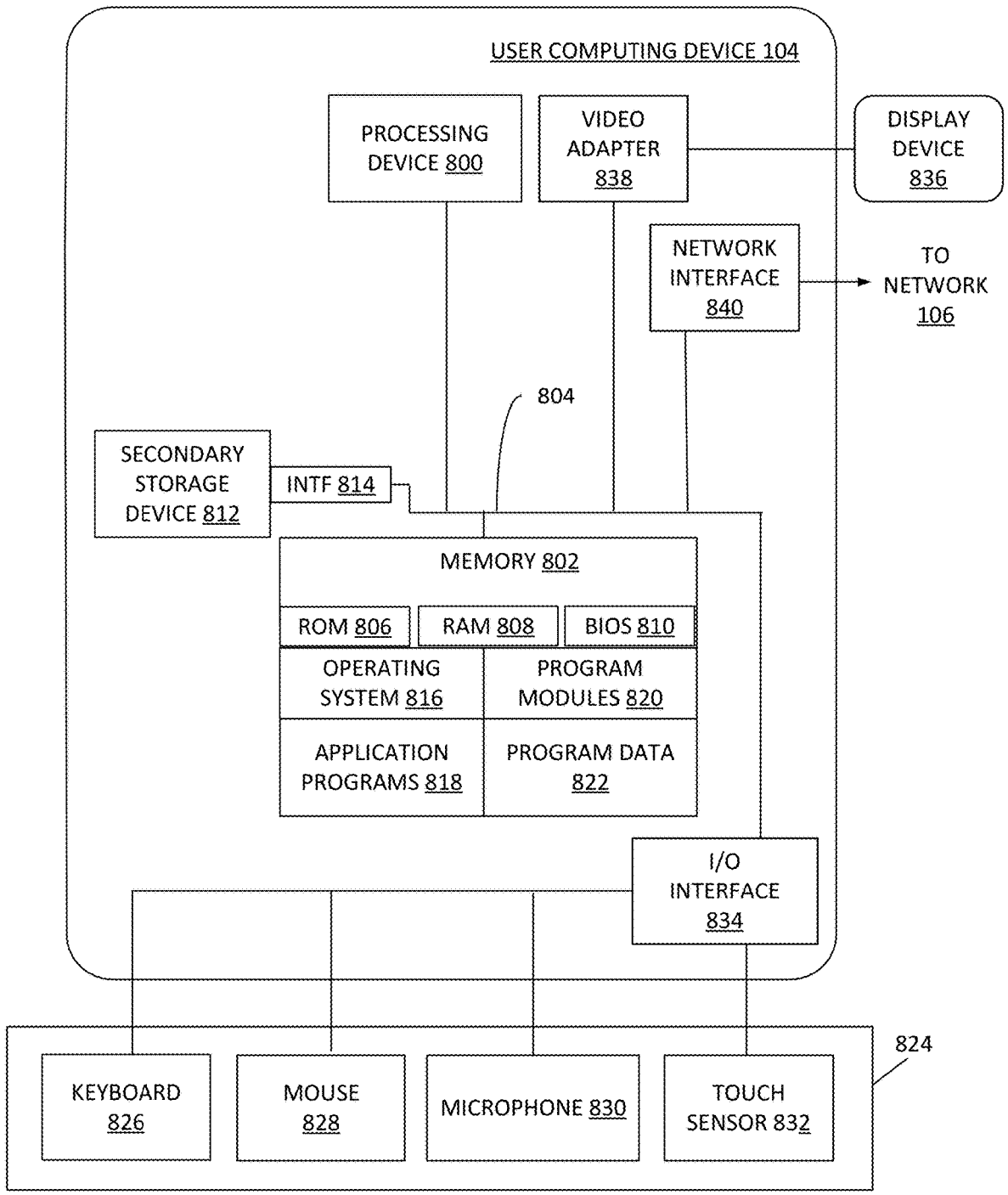
FIG. 8 is a block diagram illustrating an example architecture of a computing device.

FIG. 8 illustrates an exemplary architecture of a computing device that can be used to implement aspects of the present disclosure, including any of the plurality of computing devices described herein. The computing device illustrated in FIG. 8 can be used to execute the operating system, application programs, and software modules (including the software engines) described herein. By way of example, the computing device will be described below as the user computing device 104. To avoid undue repetition, this description of the computing device will not be separately repeated herein for each of the other computing devices, but such devices can also be configured as illustrated and described with reference to FIG. 8.

The computing device 104 includes, in some embodiments, at least one processing device 800, such as a central processing unit (CPU). A variety of processing devices are available from a variety of manufacturers, for example, Intel or Advanced Micro Devices. In this example, the computing device 104 also includes a system memory 802, and a system bus 804 that couples various system components including the system memory 802 to the processing device 800. The system bus 804 is one of any number of types of bus structures including a memory bus, or memory controller; a peripheral bus; and a local bus using any of a variety of bus architectures.

Examples of computing devices suitable for the computing device 104 include a desktop computer, a laptop computer, a tablet computer, a mobile computing device (such as a smart phone, an iPod® or iPad® mobile digital device, or other mobile devices), or other devices configured to process digital instructions.

The system memory 802 includes read only memory 806 and random access memory 808. A basic input/output system 810 containing the basic routines that act to transfer information within computing device 104, such as during start up, is typically stored in the read only memory 806.

The computing device 104 also includes a secondary storage device 812 in some embodiments, such as a hard disk drive, for storing digital data. The secondary storage device 812 is connected to the system bus 804 by a secondary storage interface 814. The secondary storage devices 812 and their associated computer readable media provide nonvolatile storage of computer readable instructions (including application programs and program modules), data structures, and other data for the computing device 104.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 812 or memory 802, including an operating system 816, one or more application programs 818, other program modules 820 (such as the software engines described herein), and program data 822. The computing device 104 can utilize any suitable operating system, such as Microsoft Windows™, Google Chrome™, Apple OS, and any other operating system suitable for a computing device.

In some embodiments, a user provides inputs to the computing device 104 through one or more input devices 824. Examples of input devices 824 include a keyboard 826, mouse 828, microphone 830, and touch sensor 832 (such as a touchpad or touch sensitive display). Other embodiments include other input devices 824. The input devices are often connected to the processing device 800 through an input/output interface 834 that is coupled to the system bus 804. These input devices 824 can be connected by any number of input/output interfaces, such as a parallel port, serial port, game port, or a universal serial bus. Wireless communication between input devices and the interface 834 is possible as well, and includes infrared, BLUETOOTH® wireless technology, 802.11a/b/g/n, cellular, or other radio frequency communication systems in some possible embodiments.

In this example embodiment, a display device 836, such as a monitor, liquid crystal display device, projector, or touch sensitive display device, is also connected to the system bus 804 via an interface, such as a video adapter 838. In addition to the display device 836, the computing device 104 can include various other peripheral devices (not shown), such as speakers or a printer.

When used in a local area networking environment or a wide area networking environment (such as the Internet), the computing device 104 is typically connected to the network 106 through a network interface 840, such as an Ethernet interface. Other possible embodiments use other communication devices. For example, some embodiments of the computing device 104 include a modem for communicating across the network.

The computing device 104 typically includes at least some form of computer readable media. Computer readable media includes any available media that can be accessed by the computing device 104. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 104. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 8 is also an example of programmable electronics, which may include one or more such computing devices, and when multiple computing devices are included, such computing devices can be coupled together with a suitable data communication network so as to collectively perform the various functions, methods, or operations disclosed herein.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:
1. A system comprising:
a central computing authority; and
a network of computing devices, at least some of the computing devices being pod computing devices physically hosted by an operator, wherein
each of the pod computing devices comprises hardware that is separate from hardware of each other pod computing device of the pod computing devices;
each of the pod computing devices is allocated to a single user computing device; and
the pod computing devices include a first pod computing device that is allocated to a first user computing device such that access to encrypted user data stored within the first pod computing device is limited to the first user computing device, the first pod computing device comprising:
a central processing unit;
computer readable storage media in data communication with the central processing unit and storing data instructions therein executable by the central processing unit, the computer readable storage media comprising:
volatile memory;
non-volatile memory in data communication with the central processing unit;
a data communication device configured to securely communicate, using encrypted communications, across a data communication network with the first user computing device, the central computing authority, and other computing devices in the network;
wherein the data instructions are executable by the central processing unit to cause the central processing unit to:

receive a first user identifier, a first password, and a private key from a first user assigned to the first pod computing device using the data communication device;

store the first user identifier and the password in the computer readable storage media to identify the first user as the owner of the first pod computing device; and store the private key in the volatile memory, such that the private key is erased from the computer readable storage media when the volatile memory loses power;

a database storing encrypted user data in the non-volatile memory, wherein the encrypted user data is encrypted using the private key of the first user, such that the encrypted user data is not accessible to the operator hosting the first pod computing device;

wherein the data instructions are further executable by the central processing device to cause the central processing unit to:

decrypt, using the private key, the encrypted user data and store unencrypted user data in the volatile memory for access by the first user computing device.

2. The system of claim 1, wherein the non-volatile memory is accessible by the central processing unit via the data communication network or locally on the first pod computing device.

3. The system of claim 1, wherein at least some of the pod computing devices are awaiting an assignment from the central computing authority.

4. The system of claim 1, wherein the encrypted communications comprise secure sockets layer protocol.

5. The system of claim 1, wherein receiving the first user identifier, the first password, and the private key from the first user computing device occurs through a interface engine.

6. The system of claim 1, wherein the first pod computing device comprises a persistent storage interface configured to communicate with the database.

7. The system of claim 6, wherein the persistent storage interface utilizes a network file system (NFS) protocol.

8. The system of claim 1, wherein the first pod computing device is configured to generate a public key that is used to encrypt shared data.

9. The system of claim 1, wherein the central computing authority further comprises a directory storing an association between a unique identification of each pod computing device and the user computing device to which it is allocated.

10. The system of claim 1, wherein the encrypted user data further comprises:

at least two records, each record corresponding to data; and at least one edge corresponding to a relationship between two records;

wherein each record and edge is owned by the first user; and wherein each record and edge is associated with a permission, the permission allowing the first user to access the at least two records and at least one edge.

11. The system of claim 10, wherein the records further comprise a plurality of fields definable by the pod computing device using a template, wherein the template is shared among the pod computing devices.

12. The system of claim 1, wherein the data instructions are further executable by the central processing unit to cause the central processing unit to:

send, to the central authority, an upgrade request for upgrading a system of the first pod computing device; and receive an upgrade to the system.

13. The system of claim 1, wherein the data instructions are further executable by the central processing unit to cause the central processing unit to send, to the central authority, a backup request including the encrypted first user data.

14. The system of claim 13, wherein the backup request occurs upon instructions received by the first user computing device.

15. The system of claim 13, wherein the backup request occurs upon the step of writing user data to the database.

16. A system comprising:

a network of pod computing devices physically hosted by an operator, wherein each of the pod computing devices comprises hardware that is separate from hardware of each other pod computing device of the pod computing devices;

each of the pod computing devices is allocated to a single user computing device; and the pod computing devices include a first pod computing device that is allocated to a first user computing device such that access to encrypted user data stored within the first pod computing device is limited to the first user computing device, wherein the first pod computing device comprises:

central processing unit;

a communication device;

computer readable storage media comprising volatile memory and non-volatile memory, the non-volatile memory in data communication with the central processing unit;

a database storing encrypted user data in the non-volatile memory, the encrypted user data not accessible to the operator hosting the first pod computing device;

wherein the computer readable storage media store data instructions that when executed by the central processing unit cause the central processing unit to:

receive a private key from the first user computing device using the communication device;

store the private key in the volatile memory;

decrypt, using the private key stored in the volatile memory, the encrypted user data stored in the non-volatile memory to create unencrypted user data;

store the unencrypted user data in the volatile memory for the first user computing device to access and perform one or more operations on the unencrypted user data.

17. The system of claim 16, wherein the communication device is configured to communicate with the first user computing device using secure data communication protocol.

18. The system of claim 16, wherein the data instructions, which when executed by the central processing unit further cause the central processing unit to generate a public key that is stored in memory of a remote central authority server.

19. The system of claim 16, wherein the data instructions, which when executed by the central processing unit further cause the central processing unit to request, from a remote central authority server, a public key of a second computer readable storage medium, wherein the public key is used to encrypt data distributed to the second computer readable storage medium.

20. The system of claim 16, wherein the communication device is an Ethernet device.

\* \* \* \* \*